(12) United States Patent
Tavkhelidze et al.

(10) Patent No.: US 6,720,704 B1
(45) Date of Patent: Apr. 13, 2004

(54) THERMIONIC VACUUM DIODE DEVICE WITH ADJUSTABLE ELECTRODES

(75) Inventors: Avto Tavkhelidze, Tbilisi (GE); Jonathan S. Edelson, Hillsboro, OR (US)

(73) Assignee: Boreaiis Technical Limited (GI)

( * ) Notice: Subject to any disclaimer, the term of this patent is extended or adjusted under 35 U.S.C. 154(b) by 0 days.

(21) Appl. No.: 09/481,803

(22) Filed: Aug. 31, 1998

Related U.S. Application Data

(63) Continuation-in-part of application No. 08/924,910, filed on Sep. 8, 1997, now abandoned.

(51) Int. Cl.$^7$ ................................................. H02N 3/00
(52) U.S. Cl. ........................ 310/306; 136/205; 136/200; 313/310; 438/380; 438/141; 62/3.2; 62/3.3
(58) Field of Search ................................ 310/306, 305; 136/200, 205, 223, 243, 253, 254; 376/321; 313/310; 438/380, 141; 62/3.2

(56) References Cited

U.S. PATENT DOCUMENTS

| | | |
|---|---|---|
| 2,510,397 A | 6/1950 | Hansell |
| 2,915,652 A | 12/1959 | Hatsopoulos |
| 3,021,472 A | 2/1962 | Hernqvist |
| 3,118,107 A | 1/1964 | Gabor |
| 3,169,200 A | 2/1965 | Huffman |
| 3,173,032 A | 3/1965 | Maynard |
| 3,194,989 A * | 7/1965 | Garbuny ..................... 310/309 |
| 3,238,395 A | 3/1966 | Sense |
| 3,239,745 A | 3/1966 | Hernqvist |

(List continued on next page.)

FOREIGN PATENT DOCUMENTS

JP    404080964 A    3/1992

OTHER PUBLICATIONS

"Thermionic Energy Conversion, vol. 1 Processes and Devices" Apr. 1974.*
Fitzpatrick. G.O. et al. "Close–Spaced Thermionic Converters with Active Spacing Control and Heat Pipe Isothermal Emitters." IEEE.vol. 2: 920–927 (1996).
Fitzpatrick. G.O. et al. "Demonstration of Close–Spaced Thermionic Converters." Abs. Papers. Am. Chem. Soc. 93355: 1.573–1.580 (1993).
Mahan. G.D. "Thermionic Refrigeration." J. Appl. Phys 76: 4362–4368 (1994).
Huffman, F.N. et al. "Preliminary Investigation of a Thermotunnel Converter." I.E.C.E.C. vol. 1: 573–579 (1988).
Houston. J.M. "Theoretical Efficiency of the Thermionic Energy Converter." J.Appl. Phys. 30: 481–487 (1959).
King. D.B. et al. "Results from the Microminiature Thermionic Converter Demonstration Testing Program." Am. Inst. of Phys. 1–56396–846: 1432–1436 (1999).
Zeng. T amd Chen. G. "Hot Electron Effects on Thermionic Emission Cooling in Heterostructures." Mat. Res. Soc. 545: 467–472 (1999).
Shakouri. A. et al. "Enhanced Thermionic Emission Cooling in High Barrier Superlattice Hetero– structures." Mat. Res. Soc. 545: 449–458 (1999).
Fukuda. R. et al. "Development of the Oxygenated Thermionic Energy Converters Utilizing the Sputtered Metal Oxides as a Collector." Am. Inst. Phys. 1444–1451 (1999).
Svensson. R. and HolmId. L. "TEC as Electric Generator in an Automobile Catalytic Converter." IEEE. vol. 2: 941–944 (1996).

*Primary Examiner*—Karl Tamai

(57) ABSTRACT

Diode devices are disclosed in which the separation of the electrodes is set and controlled using piezo-electric, electrostrictive or magnetostrictive actuators. This avoids problems associated with electrode spacing changing or distorting as a result of heat stress. In addition it allows the operation of these devices at electrode separations which permit quantum electron tunneling between them. Pairs of electrodes whose surfaces replicate each other are also disclosed. These may be used in constructing devices with very close electrode spacings.

50 Claims, 5 Drawing Sheets

U.S. PATENT DOCUMENTS

| | | | |
|---|---|---|---|
| 3,267,307 A | | 8/1966 | Fox |
| 3,267,308 A | | 8/1966 | Hernqvist |
| 3,281,372 A | | 10/1966 | Haas |
| 3,300,660 A | | 1/1967 | Bensimon |
| 3,328,611 A | | 6/1967 | Davis |
| 3,376,437 A | | 4/1968 | Meyrand, Jr. |
| 3,393,330 A | | 7/1968 | Vary |
| 3,470,393 A | | 9/1969 | Moncorge |
| 3,515,908 A | | 6/1970 | Caldwell |
| 3,519,854 A | | 7/1970 | Davis |
| 3,578,992 A | | 5/1971 | Shimada |
| 3,843,896 A | * | 10/1974 | Rason et al. .................. 310/4 |
| 4,004,210 A | | 1/1977 | Yater |
| 4,039,352 A | | 8/1977 | Marinescu |
| 4,224,461 A | * | 9/1980 | Snyder, Jr. et al. ......... 136/233 |
| 4,281,280 A | * | 7/1981 | Richards .................... 322/2 R |
| 4,410,951 A | | 10/1983 | Nakamura |
| 4,423,347 A | | 12/1983 | Kleinschmidt |
| 4,667,126 A | | 5/1987 | Fitzpatrick |
| 4,937,489 A | | 6/1990 | Hattori |
| 4,958,201 A | | 9/1990 | Mimura |
| 5,028,835 A | | 7/1991 | Fitzpatrick |
| 5,049,775 A | | 9/1991 | Smits |
| 5,083,056 A | | 1/1992 | Kondou |
| 5,119,151 A | | 6/1992 | Onda |
| 5,229,320 A | | 7/1993 | Ugajin |
| 5,233,205 A | | 8/1993 | Usagawa |
| 5,247,223 A | | 9/1993 | Mori |
| 5,307,311 A | * | 4/1994 | Sliwa, Jr. .................... 365/174 |
| 5,332,952 A | | 7/1994 | Ugajin |
| 5,351,412 A | | 10/1994 | Furuhata |
| 5,356,484 A | | 10/1994 | Yater |
| 5,374,388 A | | 12/1994 | Oda |
| 5,410,166 A | * | 4/1995 | Kennel ........................ 257/77 |
| 5,465,021 A | | 11/1995 | Visscher |
| 5,487,790 A | * | 1/1996 | Yasuda ....................... 136/200 |
| 5,521,735 A | | 5/1996 | Shimizu |
| 5,592,042 A | | 1/1997 | Takuchi |
| 5,675,972 A | | 10/1997 | Edelson |
| 5,699,668 A | * | 12/1997 | Cox ............................. 62/3.1 |
| 5,701,043 A | | 12/1997 | Razzaghi |
| 5,722,242 A | * | 3/1998 | Edelson ........................ 62/3.1 |
| 5,810,980 A | | 9/1998 | Edelson |
| 5,874,039 A | * | 2/1999 | Edelson ................. 204/290 R |
| 5,973,259 A | | 10/1999 | Edelson |
| 5,981,071 A | | 11/1999 | Cox |
| 5,981,866 A | | 11/1999 | Edelson |
| 5,994,638 A | | 11/1999 | Edelson |
| 6,064,137 A | * | 5/2000 | Cox ........................... 310/306 |
| 6,084,173 A | * | 7/2000 | DiMatteo .................... 136/201 |
| 6,089,311 A | * | 7/2000 | Edelson ................. 165/104.23 |
| 6,281,514 B1 | | 8/2001 | Tavkhelidze |

* cited by examiner

THERMIONIC VACUUM DIODE DEVICE WITH ADJUSTABLE ELECTRODES

RELATED APPLICATION

This is a Continuation in Part of U.S. patent application Ser. No. 08/924,910, filed Sep. 8, 1997 now abandoned.

This application is also related to U.S. patent application Ser. No. 09/645,997, filed Aug. 31, 1998 as a Continuation in Part of U.S. patent application Ser. No. 09/645,985, filed Feb. 9, 1998 as a Continuation in Part of U.S. Pat. No. 6,281,514, and assigned to the same assignee as the present invention.

BACKGROUND

1. Field of Invention

The present invention is related to diode devices, in particular, to diode devices in which the separation of the electrodes is set and controlled using piezo-electric, electrostrictive or magnetostrictive positioning elements. These include thermionic converters and generators, photoelectric converters and generators, and vacuum diode heat pumps. It is also related to thermotunnel converters.

2. Thermionic Generators

One form of thermionic vacuum diode is the thermionic converter. A problem associated with the design of these is the space-charge effect, which is caused by the electrons themselves as they leave the cathode. The emitted electrons have a negative charge that deters the movement of other electrons towards the anode. Theoretically, the formation of the space-charge potential barrier may be prevented in at least two ways: positive ions may be introduced into the cloud of electrons in front of the cathode, or the spacing between the electrodes may be reduced to the order of microns.

The use of positive ions to reduce space charge is not without problems. Although cesium and auxiliary discharge thermionic converters have been described, they do not have high efficiency, are costly to fabricate, and, particularly in the high-pressure ignited mode, do not have a long life. The technique of introducing a cesium plasma into the electrode space brings with it further disadvantages. These include heat exchange reactions within the plasma during the operation of the device, and the reactivity of the plasma, which can damage the electrodes.

Although Fitzpatrick (U.S. Pat. No. 4,667,126) teaches that "maintenance of such small spacing with high temperatures and heat fluxes is a difficult if not impossible technical challenge", in an article entitled "Demonstration of close-spaced thermionic converters", $28^{th}$ Intersociety Energy Conversion Engineering Conference, Vol. 1, pages 1573–1580, he goes on to disclose a close spaced thermionic energy converter which operates at temperatures of 1100 to 1500 degrees Kelvin at a variety of cesium pressures. Electrodes are maintained at a separation of the order of 10 µm by 3 ceramic spacers mounted on the collector. With electrodes at 1300 and 800 degrees Kelvin, conversion efficiencies of 11.6% were obtained. It utilizes advanced monocrystal materials to achieve reliable operation and long life, and produces a reasonable output power with good efficiency at lower temperatures where typical ignited mode devices would produce no useful power at all. It is, therefore, useful at the bottom end of cascaded thermionic systems, with a very high temperature barium-cesium thermionic converter at the top end.

To operate a converter with a gap spacing of less than 10 µm, the electrode surface must be very flat and smooth, with no deformation larger than about 0.2 µm. This places a limitation on the practical size of electrodes for the emitter and collector, because heat flux through the surfaces causes a differential thermal expansion from one side relative to the other, leading to thermal expansion-caused deformation into a "dome-like" shape. This issue is even more important in high power operation. Although this deformation can be tolerated if the diameter of the electrodes is very small, the devices described by Fitzpatrick have diameters of several centimeters. Another issue is degradation of the in-gap spacers at high emitter temperatures.

Fitzpatrick addresses both these in a later paper, entitled "Close-spaced thermionic converter with active control and heat-pipe isothermal emitters", $31^{st}$ Intersociety Energy Conversion Engineering Conference, Vol. 2, pages 920–927. He proposes a device having a large isothermal emitter, utilizing a heat pipe built into its structure with a single crystal emitting surface. The proposed device avoids degradation of the in-gap spacers at high emitter temperatures by using active spacing control, utilizing piezo-electric actuators in conjunction with feedback control for continuously adjusting the gap size.

The proposed device, however, is relatively large, expensive and not amenable to mass-production. There remains a need, therefore, for a thermionic generator which is easy to fabricate, inexpensive, reliable, of high efficiency, modular, compact and having an extended life.

For example, the alternator of the automobile could be replaced by a thermionic generator using the heat contained in the exhaust gases as a source of energy, which would lead to an increase in the efficiency of the engine. Svensson and Holmlid, in their paper entitled: "TEC as Electric Generator in an Automobile Catalytic Converter" $31^{st}$ Intersociety Energy Conversion Engineering Conference, Vol. 2, pages 941–944, propose the possible use of carbon covered electrodes which become coated with Rydberg matter, resulting in the reduction of the interelectrode distance. They report that such a device might be expected to have an efficiency of 25–30% at temperatures of 1500–1600 degrees Kelvin. To obtain the high temperatures required, a fuel mixture would be injected into the device. Different configurations are discussed, but it is not clear how such a device would be economically constructed.

Another application is in domestic and industrial heating systems. These need a pump to circulate heated water around the system, which requires a source of power. The control circuitry regulating the temperature of the building being heated also requires power. These could both be supplied by means of a thermionic generator powered by the hot flue gases.

A further application utilizes heat generated by solar radiation. This could either be in space or earth-based solar power stations, or on the roof of buildings to supply or augment the power requirements of the building.

In U.S. Pat. No. 5,994,638 to Edelson, assigned to the same assignee as the present invention, and incorporated herein in its entirety by reference, a thermionic converter having close spaced electrodes is disclosed which is fabricated using micromachining techniques. This device addresses many of the problems described above, particularly those relating to economic fabrication and how to achieve close spaced electrode design. However, in operation, temperature differences between the hot emitter and cooler collector may cause high thermal stresses leading to the shape of the region between the electrodes being altered.

The present invention extends the robustness of Edelson's previous device without detracting from its ease and economy of fabrication by allowing it actively to respond to these high thermal stresses by means of active piezo-electric, electrostrictive or magnetostrictive elements incorporated to produce a micro-electromechanical thermionic converter.

Thermotunnel Converter

The thermotunnel converter is a means of converting heat into electricity which uses no moving parts. It has characteristics in common with both thermionic and thermoelectric converters. Electron transport occurs via quantum mechanical tunneling between electrodes at different temperatures. This is a quantum mechanical concept whereby an electron is found on the opposite side of a potential energy barrier. This is because a wave determines the probability of where a particle will be, and when that probability wave encounters an energy barrier most of the wave will be reflected back, but a small portion of it will leak into the barrier. If the barrier is small enough, the wave that leaked through will continue on the other side of it. Even though the particle does not have enough energy to get over the barrier, there is still a small probability that it can tunnel through it. The thermotunneling converter concept was disclosed in U.S. Pat. No. 3,169,200 to Huffman. In a later paper entitled "Preliminary Investigations of a Thermotunnel Converter", [23rd Intersociety Energy Conversion Engineering Conference vol. 1, pp. 573–579 (1988)] Huffman and Haq disclose chemically spaced graphite layers in which cesium is intercalated in highly orientated pyrolitic graphite to form a multiplicity of thermotunneling converters in electrical and thermal series. In addition they teach that the concept of thermotunneling converter was never accomplished because of the impossibility of fabricating devices having electrode spacings of less than 10 $\mu$m. The current invention addresses this shortcoming by utilizing one or more piezo-electric, electrostrictive or magnetostrictive elements to control the separation of the electrodes so that thermotunneling between them occurs.

A further shortcoming of the devices described by Huffman is thermal conduction between the layers of the converter, which greatly reduces the overall efficiency of these thermotunneling converters.

Photoelectric Converter

In U.S. Pat. No. 5,973,259 to Edelson, assigned to the same assignee as the present invention, and incorporated herein by reference, is described a Photoelectric Generator having close spaced electrodes separated by a vacuum. Photons impinging on the emitter cause electrons to be emitted as a consequence of the photoelectric effect. These electrons move to the collector as a result of excess energy from the photon: part of the photon energy is used escaping from the metal and the remainder is conserved as kinetic energy moving the electron. This means that the lower the work function of the emitter, the lower the energy required by the photons to cause electron emission. A greater proportion of photons will therefore cause photo-emission and the electron current will be higher. The collector work function governs how much of this energy is dissipated as heat: up to a point, the lower the collector work function, the more efficient the device. However there is a minimum value for the collector work function: thermionic emission to the collector will become a problem at elevated temperatures if the collector work function is too low.

Collected electrons return via an external circuit to the cathode, thereby powering a load. One or both of the electrodes are formed as a thin film on a transparent material, which permits light to enter the device. A solar concentrator is not required, and the device operates efficiently at ambient temperature.

Vacuum Diode-Based Devices

In U.S. Pat. No. 6,089,311 to Edelson, assigned to the same assignee as the present invention, incorporated herein in its entirety by reference, a new use for thermionic vacuum diode technology is disclosed wherein a vacuum diode is constructed using very low work function electrodes. A negative potential bias is applied to the cathode relative to the anode, and electrons are emitted. In the process of emission, the electrons carry off kinetic energy, carrying heat away from the cathode and dissipating it at an opposing anode. The resulting heat pump is more efficient than conventional cooling methods, as well as being substantially scaleable over a wide range of applications. Fabrication using conventional techniques is possible.

Piezo-electric Positioning Elements

Piezo-electric worm-type shifting mechanisms, or piezo-electric motors, can move extremely short distances of the order of a single angstrom, while having a stroke of several tens of millimeters.

Scanning Tunneling Microscopes are well known for employing piezo-electric devices to maintain tip distance from a surface to an accuracy of 1 angstrom.

U.S. Pat. No. 4,423,347 to Kleinschmidt et al. discloses a type of electrically actuated positioning element formed of piezo-electric bodies, which may, for example, be used to operate a needle valve.

U.S. Pat. No. 5,351,412 to Furuhata and Hirano discloses a device which provides micro-positioning of the sub-micron order.

U.S. Pat. No. 5,049,775 to Smits discloses an integrated micro-mechanical piezo-electric motor or actuator. This has two parallel cantilever beams coated with a piezo-electric material and attached to a body to be moved at one end, and to a V-shaped foot at the other. By applying an electric field, the foot may be raised, twisted, lowered and straightened, providing movement. An example has a device with cantilever beams measuring 1×10×200 $\mu$m which can move at 1 cm/s.

The above illustrate that piezo-electric elements may be fabricated and used at micron and sub-micron scale and that they are useful for positioning objects with great accuracy. Fitzpatrick takes advantage of these features in his proposed close spaced thermionic converter. He does not teach, however, that micro-mechanical devices such as that disclosed by Smits may be adapted to form a useful function in positioning the electrodes in a micromachined thermionic vacuum diode.

Electostrictive and magnetostrictive positioning elements

Razzaghi (U.S. Pat. No. 5,701,043) teaches that some commercially available magnetostrictive materials readily produce strains 10 times higher than that of electroactive materials such as piezo-electric or electrostrictive elements. They are also superior with respect to load, creep, sensitivity to temperature and working temperature range. He discloses a high-resolution actuator using a magnetostrictive material able to achieve displacements with sub-nanometer resolution and a range of about 100 $\mu$m.

Visscher (U.S. Pat. No. 5,465,021) disclose an electromechanical displacement device which uses piezo-electric, electrostrictive or magnetostrictive clamping and transport elements.

Takuchi (U.S. Pat. No. 5,592,042) disclose a piezo-electric or electrostrictive actuator of bi-morph or uni-morph type, and teach that it may be useful as a displacement controllable element, an ink jet ejector, a VTR head, a switching element, a relay, a print head, a pump, a fan or blower.

Kondou (U.S. Pat. No. 5,083,056) disclose an improved circuit for controlling a bimorph-type electrostriction actuator.

Hattori (U.S. Pat. No. 4,937,489) disclose an electrostrictive actuator for controlling fine angular adjustments of specimens under microscopic scrutiny.

Surface Polishing

It is known to the art that over a 1 cm distance length, a surface can be polished to a fraction of a micron. However, the art provides no methods for providing surfaces which are flat to the order of tens of angstroms. Additionally, the art provides no methods of making electrodes which match each other's surface features, thus providing 2 surfaces which are flat relative to one another. The present invention discloses and claims such a technique, which allows for very close spacing between electrodes.

Definitions:

"Power Chip" is hereby defined as a device which uses a thermal gradient of any kind to create an electrical power or energy output. Power Chips may accomplish this using thermionics, thermotunneling, or other methods as described in this application.

"Cool Chip" is hereby defined as a device which uses electrical power or energy to pump heat, thereby creating, maintaining, or degrading a thermal gradient. Cool Chips may accomplish this using thermionics, thermotunneling, or other methods as described in this application.

"Gap Diode" is defined as any diode which employs a gap between the anode and the cathode, or the collector and emitter, and which causes or allows electrons to be transported between the two electrodes, across or through the gap. The gap may or may not have a vacuum between the two electrodes, though Gap Diodes specifically exclude bulk liquids or bulk solids in between the anode and cathode. The Gap Diode may be used for Power Chips or Cool Chips, for devices that are capable of operating as both Power Chips and Cool Chips, or for other diode applications.

Surface features of two facing surfaces of electrodes "matching" each other, means that where one has an indentation, the other has a protrusion and vice versa. Thus, the two surfaces are substantially equidistant from each other throughout their operating range.

BRIEF DESCRIPTION OF THE INVENTION

The present invention discloses, in one preferred embodiment, a Gap Diode fabricated by micromachining techniques in which the separation of the electrodes is controlled by piezo-electric, electrostrictive or magnetostrictive actuators. Another preferred embodiment is a Gap Diode built and operated by MicroEngineeringMechanicalSystems, or MEMS, and its equivalents, in which the separation of the electrodes is controlled by piezo-electric, electrostrictive or magnetostrictive actuators.

The present invention further discloses a Gap Diode in which the separation of the electrodes is controlled by piezo-electric, electrostrictive or magnetostrictive actuators. Preferred embodiments include Cool Chips, Power Chips, and photoelectric converters. In further embodiments, Gap Diodes may be fabricated using micromachining techniques, and include MicroEngineeringMechanicalsystems, or MEMS versions, or their equivalents, in which the electrode separation is controlled by piezo-electric, electrostrictive or magnetostrictive actuators.

In a further embodiment, the present embodiment Gap Diodes in which the separation of the electrodes is controlled by piezo-electric, electrostrictive or magnetostrictive actuators, and where the space between the electrodes is filled with an inert gas: according to this embodiment the separation of the electrodes is less than the free mean path of the electrons in the inert gas. This means that thermal conduction between the electrodes is almost entirely eliminated.

In operation, temperature differences between the emitter or cathode electrode, and the collector or anode electrode, of the Gap Diode may cause high thermal stresses leading to the space between electrodes being altered. These thermal stresses may also cause the electrodes to flex, buckle or otherwise change their shape. The present invention addresses these problems by utilizing a piezo-electric, electrostrictive, or magnetostrictive element to control the separation of the electrodes. Furthermore the present invention discloses utilizing a piezo-electric, electrostrictive, or magnetostrictive element to alter the shape of the electrodes to overcome flexing, buckling or shape-changing thermal stresses.

The present invention further discloses a method for fabricating a pair of electrodes in which any minor variations in the surface of one electrode are replicated in the surface of the other. This permits the electrodes to be spaced in close proximity.

A method of selecting materials is disclosed which can be used to compensate for thermal expansion. This method is optimal for use in thermotunneling Power Chips and Cool Chips, and also has uses in especially close-spaced thermionic Power Chips and Cool Chips.

The present invention further discloses the concept of employing electron tunneling in a Cool Chip.

These devices overcome disadvantages of prior art systems such as economy and ease of fabrication and problems introduced by heat distortion at high temperature operation.

OBJECTS AND ADVANTAGES

The present invention comprises one or more of the following objects and advantages:

It is an object of the present invention to provide Gap Diodes or Power Chips or Cool Chips in which the separation of the electrodes is controlled by piezo-electric, electrostrictive or magnetostrictive actuators.

An advantage of the present invention is that alterations to the spacing of the electrodes which may happen as a consequence of the large temperature difference between the electrodes may be nullified.

A further advantage of the present invention is that a less demanding manufacturing specification is required.

A further advantage of the present invention is that the resulting Gap Diode will be extremely resistant to vibration and shock, as the actuators can rapidly counteract any such stresses.

It is a further object of the present invention to provide Power Chips or Cool Chips or Gap Diodes in which the separation of the electrodes is reduced to micron or submicron distances, and is maintained at this small distance through the action of piezo-electric, electrostrictive or magnetostrictive actuators.

An advantage of this invention is that space charge effects are reduced.

Another advantage of this invention is that changes in electrode separation due to thermal changes occurring as the device is operated may be compensated.

It is a further object of the present invention to provide Gap Diodes or Cool Chips or Power Chips in which the separation of the electrodes is small enough to allow electrons to tunnel between cathode and anode, and in which this small separation between electrodes is maintained through the action of piezo-electric, electrostrictive or magnetostrictive actuators.

An advantage of this invention is that the efficiency of the inter-converter is substantially increased.

An advantage of this invention is that heat energy can be efficiently inter-converted and pumped from one 5 electrode to another.

An advantage of this invention is that a temperature differential can be used to generate electricity.

An advantage of this invention is that a low work function electrode is not required.

An advantage of this invention is that, when it is used to pump heat, it can cool down to 1 degree Kelvin.

It is a further object of the present invention to provide Gap Diodes in which the separation of the electrodes is less than the free mean path of an electron, and in which this small separation between electrodes is maintained through the action of piezo-electric, electrostrictive or magnetostrictive actuators.

An advantage of this invention is that the space between the electrodes may be filled with an inert gas.

An advantage of this invention is that thermal conduction between the electrodes is substantially reduced, and the efficiency of the device is substantially increased.

It is a still further object of the present invention to provide Gap Diodes fabricated using micromachining techniques in which the separation between electrodes is maintained through the action of piezo-electric, electrostrictive or magnetostrictive actuators.

An advantage of this invention is that the devices may be constructed inexpensively and reliably.

It is a still further object of the present invention to provide Power Chips and Cool Chips fabricated and operated by MicroEngineeringMechanicalSystems, or MEMS in which the separation between electrodes is maintained through the action of piezo-electric, electrostrictive or magnetostrictive actuators.

An advantage of this invention is that the devices may be constructed cheaply and reliably.

It is a yet further object of the present invention to provide pairs of electrodes in which any minor imperfections in the surface of one are replicated in the surface of the other.

An advantage of this invention is that electrodes may be positioned such that the separation between them is of a very small magnitude.

An advantage of this invention is that a larger surface area can be used for pumping heat, converting heat to electricity, or any other functions of a diode.

An advantage of this invention is that benefits accruing to small spaces, such as tunneling effects, can be maximized.

It is a yet further object of the present invention to provide a method of selection of electrode materials in which the thermal expansion coefficient of the cold side is larger than that of the cold side.

An advantage of this invention is that the temperature difference between the two electrodes can be greatly increased before the electrodes touch each other due to thermal expansion.

DETAILED DESCRIPTION OF THE INVENTION

The following description describes a number of preferred embodiments of the invention and should not be taken as limiting the invention.

The actuating element is often described as being connected to the collector electrode, however, in some embodiments it could by applied to the emitter electrode instead.

Figure 1:
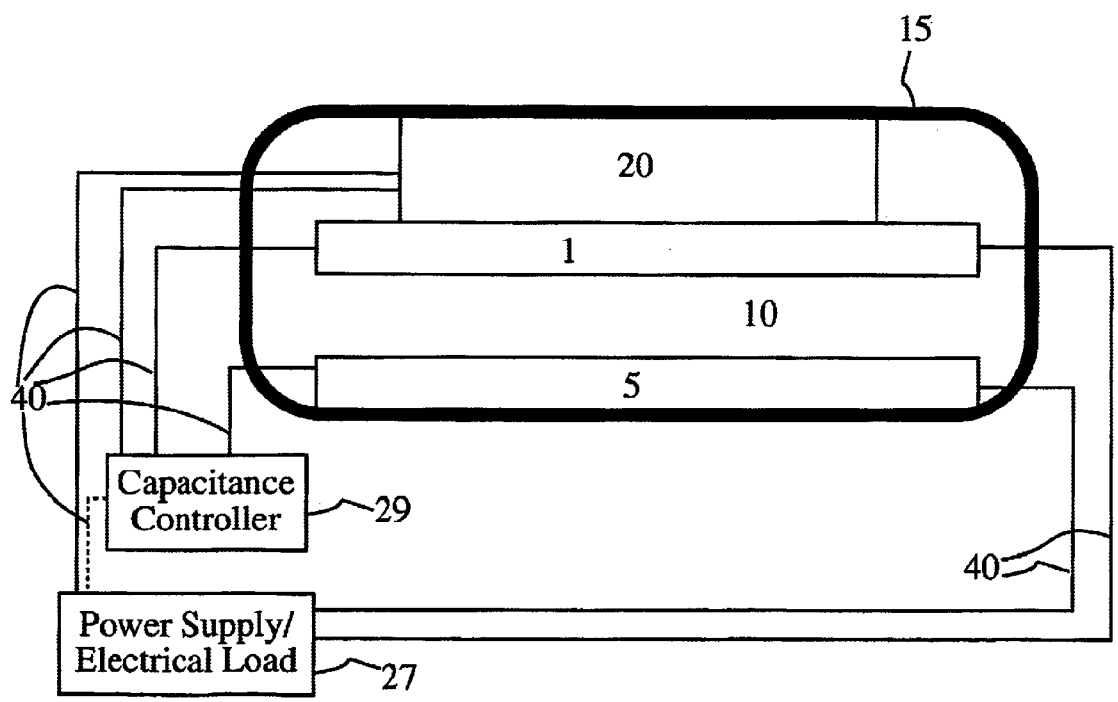
FIG. 1 is a diagrammatic representation of one embodiment of the electrode configuration of a Gap Diode, Power Chip or Cool Chip showing a piezo-electric actuator supporting an electrode.

Referring now to FIG. 1, two electrodes 1 and 5 are separated by a region between an emitter and a collector 10 and housed in a housing 15. Electrode 1 is functionally connected to a piezo-electric actuator 20. An electric field is applied to the piezo-electric actuator via connecting wires 40 which causes it to expand or contract longitudinally, thereby altering the distance of the region 10 between electrodes 1 and 5. Electrodes 1 and 5 are connected to a capacitance controller 29 which both modifies the piezo-electric actuator 20, and can give feedback to a power supply/electrical load 27 to modify the heat pumping action, and generating action, respectively. The electrodes 1 and 5 are connected to power supply/electrical load 27 via connecting wires 40, which may also be used to connect the electrodes 1 and 5 with capacitance controller 29.

Figure 2:
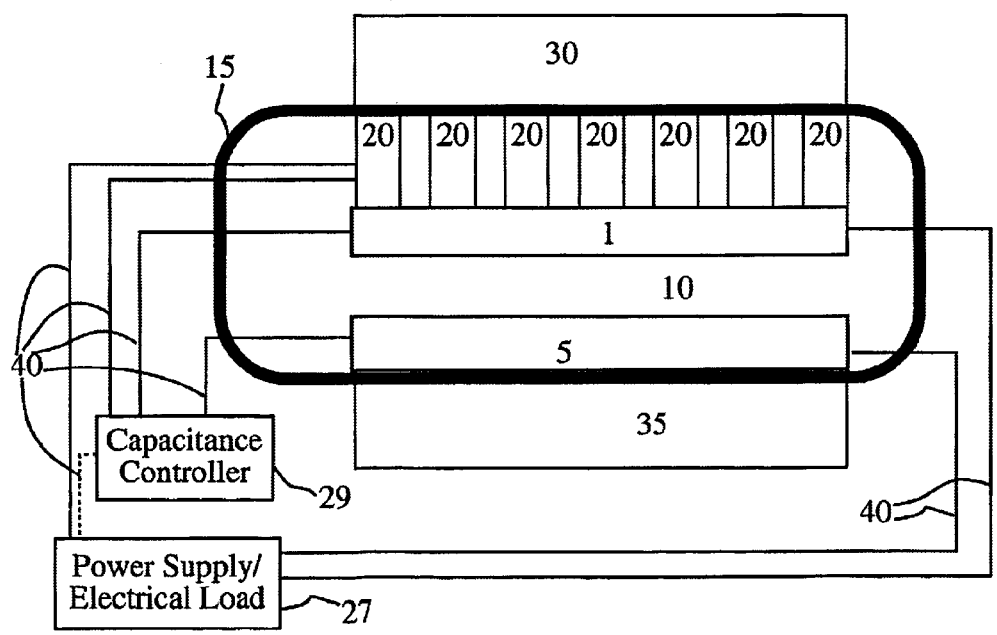
FIG. 2 is a diagrammatic representation of one embodiment of the electrode configuration of a Gap Diode, Power Chip or Cool Chip, showing piezo-electric actuators at intervals along the under-surface of an electrode.

Referring now to FIG. 2, two electrodes 1 and 5 are separated by a region 10 and housed in a housing 15. Electrode 1 is attached to a number of piezo-electric actuators 20 at intervals. An electric field is applied to the piezo-electric actuators via connecting wires 40 which causes them to expand or contract longitudinally, thereby altering the longitudinal distance of region 10 between electrodes 1 and 5. Electrodes 1 and 5 are connected to capacitance controller 29 which both modifies the piezo-electric actuator 20, and can give feedback to a power supply/electrical load 27 to modify the heat pumping action, and generating action, respectively. The longitudinal distance of region 10 between electrodes 1 and 5 is controlled by applying an electric field to piezo-electric actuators 20. The capacitance between emitter 1 and collector 5 is measured and controlling circuitry 29 adjusts the field applied to piezo-electric actuators 20 to hold the capacitance, and consequently the distance between the electrodes 10, at a predetermined fixed value. Alternatively, the controller 29 may be set to maximize the capacitance and thereby minimize the distance 10 between the electrodes. The diagram shown in FIG. 2 can be used as a thermionic device and/or as a tunneling device, and can be used to function as a Power Chip and/or as a Cool Chip. Capacitance controller 29 may be composed of multiple elements, and each piezo-electric actuator 20 may receive its own distinct signal, independent from the control of surrounding elements.

If it is used as a thermionic device, then electrodes 1 and 5 are made from, or are coated with, a thermionically emissive material having a work function consistent with the copious emission of electrons at the temperature of thermal interface 30. The specific work functions can be determined by calculation, or by consulting the art.

When functioning as a Cool Chip, electrons emitted from emitter 1 move across an evacuated space 10 to a collector 5, where they release their kinetic energy as thermal energy which is conducted away from collector 5 through housing 15 to thermal interface 35, which is, in this case, hotter than thermal interface 30 which the electron emission serves to cool.

When functioning as a Power Chip, electrons emitted from emitter 1 move across an evacuated space 10 to a collector 5, where they release their kinetic energy as thermal energy which is conducted away from collector 5 through housing 15 to thermal interface 35, and a current is generated for electrical load 27. The feedback loop from the capacitance controller 29 to the piezo-electric actuators 20 allows for the device to adjust for varying conditions, including vibration, shock, and thermal expansion.

When functioning as a tunneling Gap Diode, as one side of the device becomes hot and its components expand, the distance between the electrodes can be maintained at a fixed distance with the feedback loop between capacitance controller 29 and piezo-electric actuators 20. Provided the surface of emitter 1 and collector 5 are made sufficiently smooth (or, as discussed below, matching one another) that emitter 1 may be moved into such close proximity to collector 5 that quantum tunneling between the electrodes occurs. As mentioned above, this device can be used as a Gap Diode, a Power Chip, or a Cool Chip. Under these conditions, it is not necessary that region 10 should be evacuated. When the gap distance between the electrodes is in the order of tens of angstroms, thermal conduction through a gas is considerably lessened. In a preferred embodiment, the gap distance is less than 200 angstroms. In a particularly preferred embodiment, the gap distance is 100 angstroms or less. In all tunneling embodiments disclosed in this application, this advantage is noted, especially for applications where thermal conduction is a concern, such as Power Chips and Cool Chips. Hence the region 10 is in some embodiments filled with an inert gas.

When functioning as a diode which is not designed to facilitate heat flow, thermal interface 30 and thermal interface 35, are not necessary, and the resulting device could be integrated into, and used for ordinary diode applications.

It is to be understood that the term "evacuated" signifies the substantial removal of the atmosphere between the electrodes, but does not preclude the presence of atoms such as cesium.

Figure 3:
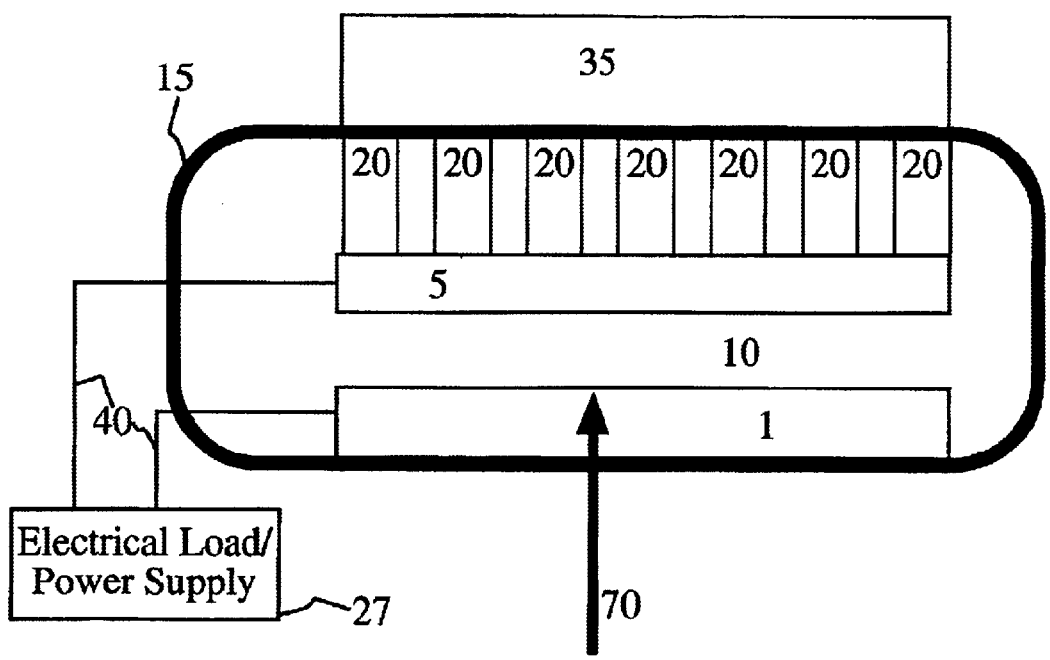
FIG. 3 is a diagrammatic representation of one embodiment of a photoelectric Power Chip with electrode separation controlled by piezo-electric actuators.

Referring now to FIG. 3, which shows in a diagrammatic form a thermal interface 35, electrical connectors 40, and electrical load/power supply 27 for a photoelectric generator embodiment of the device shown in FIG. 2. For the sake of clarity, the controlling circuitry comprising connecting wires 40, and capacitance controller 29, and additional connecting wires 40 shown in FIG. 2 has been omitted. A light beam 70 passes through housing 15 and impinges on an emitter 1. Emitter 1 is made from, or is coated with, a photoelectrically emissive material having a work function consistent with the copious emission of electrons at the wavelengths of light beam 70. Electrons emitted from emitter 1 move across an evacuated space 10 to a collector 5, where they release their kinetic energy as thermal energy which is conducted away from collector 5 through piezo-electric actuators 20 and housing 15 to thermal interface 35. The electrons return to emitter 1 by means of external circuit 40 thereby powering electrical load/power supply 27. The spacing of region 10 between electrodes 1 and 5 is controlled as described above (see FIG. 2). This means that as the device becomes hot and its components expand, the distance between the electrodes can be maintained at a fixed distance. Provided the surface of emitter 1 and collector 5 are made sufficiently smooth, the collector 5 may be moved into such close proximity to emitter 1 that quantum tunneling between the electrodes occurs. Under these conditions, it is not necessary that region 10 should be evacuated, and the device operates as a tunneling Power Chip. It should be noted that a photoelectric Power Chip may use a temperature differential, by collecting some of the solar energy in heat form. In this embodiment, the device would function as the Power Chip in FIG. 2, the only difference being that the heat energy provided would be solar in origin. The device in FIG. 3 may alternatively be primarily photoelectric, where direct photon-electron contact results in the electron either topping the work-function barrier and emitting thermionically, or, in the tunneling version where the incidenting photon may cause the electron to tunnel. The device may also be a combination of the above, providing any combination of thermionic emission caused by solar heat, thermionic emission caused by direct photoelectric effects, thermotunneling from solar heat, or tunneling emission caused by direct photoelectric effects.

Figure 4:
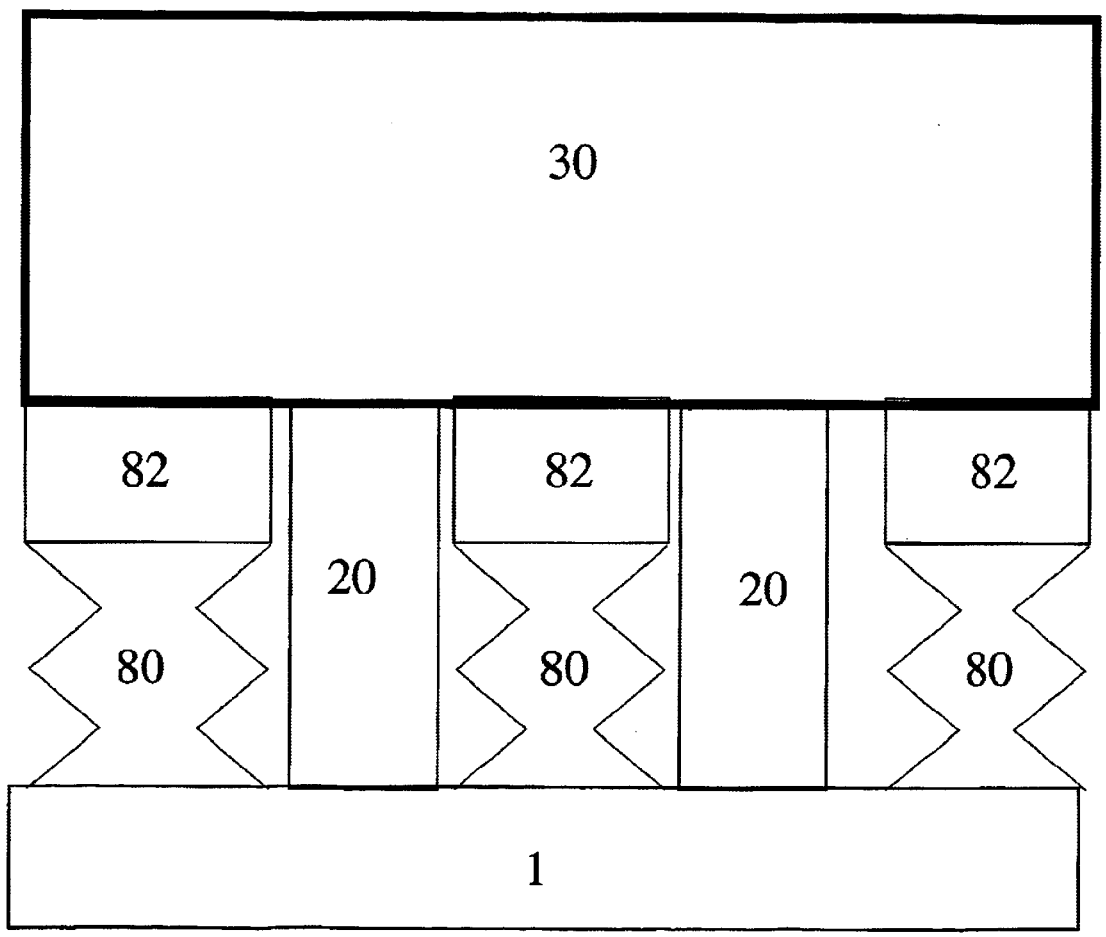
FIG. 4 is a diagrammatic representation of one embodiment of a device illustrating how heat transfer is facilitated.

Referring now to FIG. 4, which shows a preferred embodiment for facilitating heat transfer between a thermal interface 30 and an electrode 1, corrugated tubes 80, preferably fabricated from stainless steel, and form part of the structure between electrode 1 and thermal interface 30. These tubes may be positioned with many variations, and act to allow for the movement of the positioning elements 20 and of the electrode 1 whilst maintaining support, or containment, etc., for the device, by being able to be stretched and/or compressed longitudinally. In some embodiments, corrugated tubes 90 may form the walls of a depository of a metal powder 82, preferably aluminum powder with a grain size of 3–5 microns. More metal powder 82 would be used to receive heat transferred to the collector electrode 1, but the surroundings of the metal powder would be made smaller as the positioning elements 20 would cause the electrode 1 to move toward the thermal interface 30. Hence the use of an expandable depository, made from corrugated tubing 80. Corrugated tubes 80 may also enclose the entire device, to allow for movement, as well as individual piezo-electric actuators 20.

Figure 5:
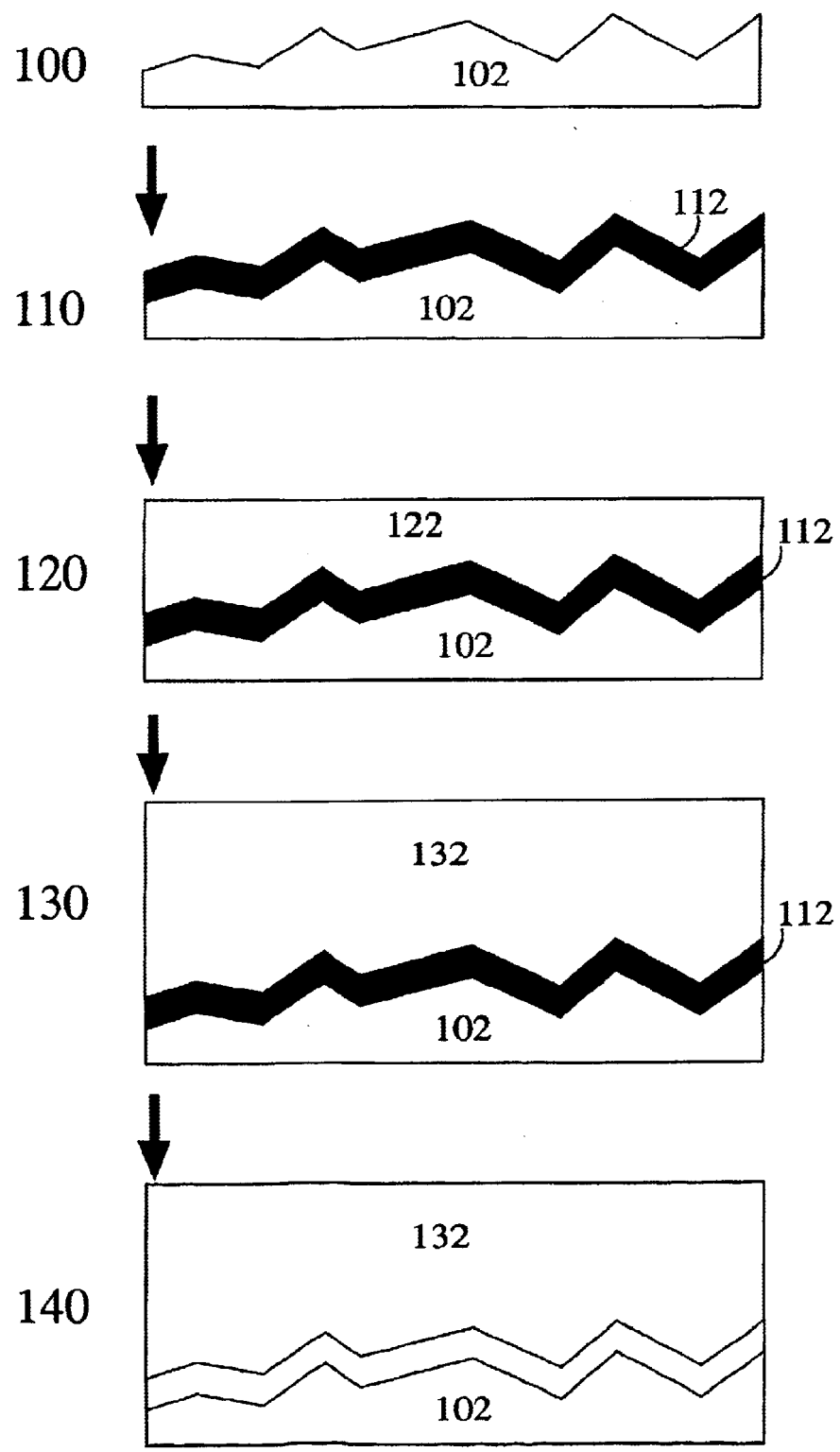
FIG. 5 is a schematic showing a process for the manufacture of pairs of electrodes which have approximately matching surface details.

For currently available materials, a device having electrodes of the order of 1×1 cm, surface irregularities are likely to be such that electrode spacing can be no closer than 0.1 to 1.0 $\mu$m, which is not sufficiently close for quantum tunneling to occur. However for smaller electrodes of the order of 0.05×0.05 cm, surface irregularities will be sufficiently small to allow the electrodes to be moved to a separation of 5 nm or less, which is sufficiently close for quantum tunneling to occur. It is likely that continued developments in electrodes having smoother surfaces will eventually allow large (1×1 cm) electrodes to be brought into close proximity so that electron tunneling may occur. One such approach is illustrated and disclosed in FIG. 5, which describes in schematic form a method for producing pairs of electrodes having substantially smooth surfaces in which any topographical features in one are matched in the other. The method involves a first step 100 in which a polished monocrystal of material 102 is provided. This forms one of the pair of electrodes. Material 102 may also be polished tungsten, or other materials. In a step 110 a thin layer of a second material 112, is deposited onto the surface of the material 102. This layer is sufficiently thin so that the shape of the polished surface 102.is repeated with high accuracy. A thin layer of a third material 122 is deposited on layer 112 in a step 120, and in a step 130 another layer is grown electrochemically to form a layer 132. This forms the second electrode. In one preferred embodiment, second material 112 has a melting temperature approximately 0.8 that of first material 102 and third material 122. In a particularly preferred embodiment, second material 112 is lead and third material 122 is aluminum. In a step 140 the composite formed in steps 100 to 130 is heated up to a temperature greater than the melting temperature of layer 112 but which is lower than the melting temperature of layers 102 and 132. In a particularly preferred embodiment where second material 112 is lead and third material 122 is aluminum, the composite is heated to about 800 degrees Kelvin. As layer 112 melts, layers 102 and 132 are drawn apart, and layer 112 is allowed to evaporate completely. In another preferred embodiment, layer 112 may be removed by introducing a solvent which dissolves it, or by introducing a reactive solution which causes the material to dissolve. This leaves two electrodes 102 and 132 whose surfaces replicate each other. This means that they may be positioned in very close proximity, as is required, for example, for the thermotunnel Power Chip and Cool Chip. In a variation of the method shown in FIG. 3, piezo-electric actuators 20 may be attached to one or both of the electrodes 102 and 132 and used to draw the two apart as the intervening layer 112 melts. This ensures that the two electrodes 102 and 132 are then in the correct orientation to be moved back into close juxtaposition to each other by the piezo-electric actuators.

When considering a Gap Diode wherein the two electrodes are close enough to one another to allow for electron tunneling to occur, thermal expansion considerations are quite important. If thermal expansion is not taken into account, then the two electrodes could touch, causing the device to fail. The present invention discloses that if the cold side of the Gap Diode has a thermal expansion coefficient larger than that of the hot side, then the risk of touching is minimized. A preferred embodiment for this selection process, depending on the design temperature ratios of the device, is that the cold side should have a thermal expansion coefficient which is a multiple of the hot side. Specific embodiments include the use of aluminum on the cold side and titanium on the hot side. The thermal expansion coefficient of aluminum is 6 times that of titanium, and it is disclosed that these two materials form the electrodes, when combined with the electrode matching invention shown in FIG. 5, and will tolerate a difference in temperature between the two sides of up to 500 degrees Kelvin.

SUMMARY, RAMIFICATIONS AND SCOPE

The essence of the present invention are Power Chips and Cool Chips, utilizing a Gap Diode, in which the separation of the electrodes is set and controlled using piezo-electric, electrostrictive or magnetostrictive or other electroactive positioning elements.

Included in this invention is a method for constructing electrodes with matching topologies, the use of thermotunneling to produce a cooling effect, the use of solar energy as the motive energy for Power Chips, the use of small, and angstrom-scale gaps for insulation, Although the above specification contains many specificities, these should not be construed as limiting the scope of the invention but as merely providing illustrations of some of the presently preferred embodiments of this invention.

For example, the piezo-electric, electrostrictive or magnetostrictive actuators could be used to position either or both electrodes.

Such actuators, which this invention believes are necessary for accurate separation between the electrodes of any tunneling Power Chip or tunneling Cool Chip, do not need to be active once the device has been manufactured. For small temperature variations, it is conceivable that the capacitance loop and power supply for the actuators themselves will not be necessary, and the electrodes can be locked into place in the manufacturing or packaging process. Thus, in operation the actuators would not be necessary, as the gap would not be compromised with smaller temperature fluctuations.

In the above specification, capacitance is used to measure the distance between the electrodes. Other methods known in the art may be used, including measuring the tunneling current and optical interrferometry. The generated current produced by a thermionic, thermotunneling or photoelectric Power Chip may also be measured to assess the separation of the electrodes. Other properties which may be measured include heat, for example the temperature of one or both of the electrodes may be used to initiate programmed actuation of the piezo-electric, electrostrictive or magnetostrictive elements. The position of the electrodes may also be set according to the length of time the device has been in operation. Thus it may be envisaged that the electrodes are set at a certain distance when the device is first turned on, and then the positioning of the electrodes is adjusted after certain predetermined time intervals.

In addition, if the inter-converters are constructed using micro-machining techniques, the controlling circuitry for the separation of the electrodes may be deposited on the surface of the wafer next to the piezo-electric, electrostrictive or magnetostrictive actuators.

Although no specific construction approaches have been described, the devices of the invention may be constructed as MicroElectroMechanicalSystems(MEMS) devices using micro-machining of an appropriate substrate. Integrated circuit techniques and very large scale integration techniques for forming electrode surfaces on an appropriate substrate may also be used to fabricate the devices. Other approaches useful in the construction of these devices include vapor deposition, fluid deposition, electrolytic deposition, printing, silk screen printing, airbrushing, and solution plating.

Substrates which may be used in the construction of these devices are well known to the art and include silicon, silica, glass, metals, and quartz.

Additionally, the active control elements may be pulsed, which will generate AC power output when the device is used as a power generator. The pulsing speeds of piezo-electric actuators are well within the requirements necessary for standard alternating voltage outputs.

What is claimed is:

1. Apparatus for the conversion of energy comprising:
   a) a source of energy;
   b) an emitter electrode connected to said source of energy;
   c) a collector electrode,
   d) an electrical circuit connecting said electrodes; and
   e) manipulating means for controlling the distance separating said electrodes, connected to either or both of said electrodes;
   wherein said emitter electrode and said collector electrode each comprise a surface for positioning facing the other, wherein said surfaces are substantially flat and wherein minor topographical features of said emitter electrode surface match topographical feature of said collector electrode surface.

2. The apparatus of claim 1 further comprising housing means for said apparatus.

3. The apparatus of claim 2 wherein said housing means is thermally conductive.

4. The apparatus of claim 2 wherein said housing is flexible to allow the movement of said manipulating means and of said electrodes.

5. Apparatus for the conversion of energy, comprising,
   a) a source of energy for promoting electron tunneling, and,
   b) an emitter electrode, connected to said source of energy, and,
   c) a collector electrode, positioned sufficiently close to said emitter electrode for electrons to tunnel from the emitter electrode to the collector electrode, and,
   d) electrical circuit means, connected to said electrodes, for the circulation of electrons, and,
   e) manipulating means for controlling the relative electrode positioning, connected to one or both of said electrodes, and
   f) housing means for said apparatus, and
   g) thermally conductive metal powder connected to said collector electrode for the transferal of thermal energy, and
   h) an extendable depository for said metal powder, for providing room for the metal powder as the collector electrode is moved to the area previously occupied by the metal powder.

6. The apparatus of claim 1 further comprising measuring means to enable the measurement of the distance separating said electrodes.

7. The apparatus of claim 6 wherein said measuring means comprises apparatus for measuring capacitance.

8. The apparatus of claim 6 wherein said measuring means comprises apparatus for measuring tunneling current.

9. The apparatus of claim 6 wherein said measuring means comprises optical interferometry.

10. The apparatus of claim 1 wherein said manipulating means is selected from the group consisting of: piezoelectric, electrostrictive, and magnetostrictive actuators.

11. The apparatus of claim 1 wherein said manipulating means comprises multiple actuators.

12. The apparatus of claim 11 comprising means for controlling said multiple actuators independently.

13. The apparatus of claim 1, wherein the conversion of energy is the conversion of thermal energy to electrical energy, wherein said source of energy comprises a source of thermal energy, and wherein said apparatus further comprises:
   a) a first thermal interface thermally connecting said source of energy to said emitter electrode;
   b) a second thermal interface thermally connecting a heat sink means to said collector electrode;
   c) an electrical load, electrically connected by said circuit between said collector electrode and said emitter electrode.

14. The apparatus of claim 13 wherein said source of thermal energy is of solar origin.

15. The apparatus of claim 13 wherein said distance separating said emitter electrode and said collector electrode is sufficiently small for electrons to tunnel from said emitter electrode to said collector electrode.

16. The apparatus of claim 1, wherein the conversion of energy is the conversion of light energy to electrical energy, wherein said source of energy comprises a source of photons, directed at said emitter electrode for impacting the electrons in said emitter electrode and for causing said electrons to tunnel to said collector electrode, and wherein said apparatus further comprises an electrical load, electrically connected by said circuit between said collector electrode and said emitter electrode.

17. The apparatus of claim 16 wherein said conversion of energy additionally comprises the conversion of heat energy to electrical energy and wherein said source of photons is also a source of thermal energy.

18. The apparatus of claim 16 wherein said distance separating said emitter electrode and said collector electrode is sufficiently small for electrons to tunnel from said emitter electrode to said collector electrode.

19. The apparatus of claim 1, wherein the conversion of energy is the conversion of electrical energy to heat pumping capacity, wherein said source of energy comprises an electrical power supply, and wherein said apparatus further comprises:
   a) a heat source and a heat sink, wherein said heat source may be cooler than said heat sink, and wherein said heat source is thermally connected to said emitter electrode and said heat sink is thermally connected to said collector electrode, and,
   b) means for applying a voltage bias to said electrodes for causing said emitter electrode to emit electrons originating from above the Fermi level via quantum mechanical tunneling, whereby heat pumping is enabled.

20. The apparatus of claim 19 wherein said distance separating said emitter electrode and said collector electrode is sufficiently small for electrons to tunnel from said emitter electrode to said collector electrode.

21. The apparatus of claim 1 wherein said distance separating said electrodes is controlled at an initial value by said controlling means.

22. The apparatus of claim 1 wherein said distance separating said electrodes is 10 angstroms.

23. The apparatus of claim 1 wherein said distance separating said electrodes is 100 angstroms or less.

24. The apparatus of claim 1 wherein said distance separating said electrodes is 200 angstroms or less.

25. The apparatus of claim 1 wherein a region between said electrodes is evacuated.

26. The apparatus of claim 1 wherein a region between said electrodes comprise an inert gas.

27. The apparatus of claim 26 wherein said inert gas is argon.

28. The apparatus of claim 1 wherein said distance separating said emitter electrode and said collector electrode is sufficiently small for electrons to tunnel from said emitter electrode to said collector electrode.

29. A thermal insulator for thermally insulating two surface from one another, wherein said surfaces am substantially flat and wherein minor topographical feature of one surface match topographical features of the other surface, comprising an inert gas enclosed in a gap of between 1 and 100 angstroms thickness between said two surfaces, and further comprising a manipulating means selected from the group consisting of electroactive, magnetostrictive, electrostrictive, and piezo-electric means, wherein the manipulating means is connected to one or both of said surfaces and is for controlling the distance of the surfaces from one another.

30. A first and a second electrode for use in a thermionic diode device, each electrode having a surface for positioning facing the other electrode, wherein said surfaces are substantially flat and wherein minor topographical features of one electrode surface match topographical features of the other electrode surface.

31. A diode device, selected from the group consisting of: thermionic Power Chips, thermionic Cool Chips, thermo-tunneling Power Chips, thermo-tunneling Cool Chips, photoelectric Power Chips, and Gap Diodes, comprising the first and second electrodes of claim 30.

32. The diode device of claim 31 wherein said electrodes are positioned closer than 200 angstroms from one another.

33. The diode device of claim 31 wherein the electrodes are positioned 100 angstroms apart or closer.

34. The diode device of claim 33 wherein an inert gas fills a region between said electrodes.

35. The diode device of claim 31 further comprising manipulating means for controlling the spacing between said electrodes.

36. The diode device of claim 35 wherein said manipulating means is selected from the group consisting of: electroactive, magnetostrictive, electrostrictive, and piezo-electric means.

37. The two electrodes of claim 30 in which the electrodes have differing thermal expansion coefficients.

38. The two electrodes of claim 37 wherein one electrode is for higher temperature operation than the other electrode, and said electrode for higher temperature operation has a lower thermal expansion coefficient than said other electrode.

39. The two electrodes of claim 38 wherein the ratio of said thermal expansion coefficients is greater than four to one.

40. The two electrodes of claim 38 wherein said electrode for higher temperature operation comprises titanium.

41. The two electrodes of claim 38 wherein said other electrode comprises aluminum.

42. A method for making the pair of electrodes of claim 30 comprising the steps of:
   a) providing a first electrode with a substantially flat surface fabricated from a first material;
   b) coating said surface of said first electrode with a thin layer of a second material;
   c) coating said layer of said second material with a layer of a third material, said third material forming a second electrode;
   d) separating said first electrode and said third material from one another, in a manner non-destructive to said first electrode and said third material, wherein surface features of said second electrode match surface features of said first electrode;
   e) removing said second material.

43. The method of claim 42 further comprising the steps of:
   a) positioning said electrodes less than 100 angstroms apart
   b) adding an inert gas to the region between said electrodes to thermally insulate the electrodes from one another.

44. The method of claim 43 further wherein said inert gas is argon.

45. The method of claim 42 in which said second material is removed by a process comprising heating to a temperature greater than that of the melting temperature of said second material but lower than the melting temperature of said first electrode and of said third material, so as to evaporate said second material.

46. The method of claim 42 additionally comprising the steps of:
   a) attaching said first electrode and said third material to controllable positioning means;
   b) separating said first material from said third material in step (d) of claim 33 using said controllable positioning means, so that surface features on the surface of said first electrode are maintained in spatial orientation with said matching surface features on said second electrode.

47. The method of claim 42 in which said second material is removed by a method comprising applying a vacuum to pump out any materials except said first electrode and said second material.

48. The method of claim 45 wherein said second material has a melting temperature approximately 0.8 of a melting temperature of said first material and said third material.

49. The method of claim 45 wherein said second material comprises lead.

50. The method of claim 45 wherein said third material comprises aluminum.

* * * * *